US012218570B2

(12) United States Patent
Jing et al.

(10) Patent No.: US 12,218,570 B2
(45) Date of Patent: Feb. 4, 2025

(54) ROTATING ELECTRIC MACHINE

(71) Applicant: HITACHI ASTEMO, LTD., Hitachinaka (JP)

(72) Inventors: Zhi Jing, Hitachinaka (JP); Satoshi Yamamura, Hitachinaka (JP); Kenichi Nakayama, Hitachinaka (JP); Tomohiro Adachi, Hitachinaka (JP); Shinji Yamazaki, Hitachinaka (JP); Hiromitsu Okamoto, Hitachinaka (JP); Yuuki Takahashi, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 228 days.

(21) Appl. No.: 18/009,134

(22) PCT Filed: Feb. 5, 2021

(86) PCT No.: PCT/JP2021/004263
§ 371 (c)(1),
(2) Date: Dec. 8, 2022

(87) PCT Pub. No.: WO2021/255983
PCT Pub. Date: Dec. 23, 2021

(65) Prior Publication Data
US 2023/0216378 A1    Jul. 6, 2023

(30) Foreign Application Priority Data

Jun. 15, 2020   (JP) ................................ 2020-102890

(51) Int. Cl.
*H02K 5/20*        (2006.01)
*H02K 1/16*        (2006.01)
*H02K 9/19*        (2006.01)

(52) U.S. Cl.
CPC ............... *H02K 9/19* (2013.01); *H02K 1/165* (2013.01)

(58) Field of Classification Search
CPC ............ H02K 9/19; H02K 9/193; H02K 9/00; H02K 5/20; H02K 5/203; H02K 5/04; H02K 1/27; H02K 1/165
See application file for complete search history.

(56) References Cited

U.S. PATENT DOCUMENTS 7,009,317 B2 *   3/2006   Cronin ................... H02K 5/203
                                                   310/52
8,247,934 B2 *   8/2012   Matsui ..................... H02K 9/19
                                                   310/53

(Continued)

FOREIGN PATENT DOCUMENTS

CN    109936232 A  *  6/2019
CN    110247513 A  *  9/2019

(Continued)

OTHER PUBLICATIONS

International Search Report with English Translation and Written Opinion of International Application No. PCT/JP2021/004263 dated May 18, 2021.

*Primary Examiner* — Edgardo San Martin
(74) *Attorney, Agent, or Firm* — Foley & Lardner LLP

(57) ABSTRACT

A rotating electric machine including a rotor, a stator, and a case forming outflow holes through which a refrigerant flows out toward an extra-slot conductor of a stator coil. The outflow holes are arranged above the extra-slot conductor, and when the bending direction of the extra-slot conductor with respect to an intra-slot conductor arranged on the outermost diameter side in a slot in the stator coil on an upper portion of the stator is a coil bending direction, the first outflow hole is arranged on the bending direction side with respect to a vertical line passing through the rotation (Continued)

center axis, and the second outflow hole is arranged on a side opposite to the bending direction with respect to the vertical line, and the arrangement angle of the second outflow hole with reference to the vertical line is larger than the arrangement angle of the first outflow hole with reference to the vertical line.

4 Claims, 10 Drawing Sheets

(56) References Cited

U.S. PATENT DOCUMENTS

| | | | | |
|---|---|---|---|---|
| 8,552,603 | B2 * | 10/2013 | Minemura | H02K 9/19 |
| | | | | 310/59 |
| 8,629,586 | B2 * | 1/2014 | Minemura | H02K 9/19 |
| | | | | 310/58 |
| 10,892,662 | B2 * | 1/2021 | Seki | H02K 3/522 |
| 10,951,093 | B2 * | 3/2021 | Yasuda | H02K 5/203 |
| 11,125,315 | B2 * | 9/2021 | Graves | H02K 7/003 |
| 2009/0206688 | A1 * | 8/2009 | Sano | H02K 5/203 |
| | | | | 310/58 |
| 2011/0316367 | A1 | 12/2011 | Takahashi et al. | |
| 2022/0247272 | A1 * | 8/2022 | Murakami | H02K 5/203 |

FOREIGN PATENT DOCUMENTS

| | | | | | |
|---|---|---|---|---|---|
| CN | 111342586 | A | * | 6/2020 | B60K 1/00 |
| CN | 112816238 | A | * | 5/2021 | |
| CN | 113422472 | A | * | 9/2021 | |
| JP | 2004180376 | A | * | 6/2004 | |
| JP | 2005-130588 | A | | 5/2005 | |
| JP | 2005-253263 | A | | 9/2005 | |
| JP | 2006115651 | A | * | 4/2006 | |
| JP | 2008263753 | A | * | 10/2008 | |
| JP | 2011097761 | A | * | 5/2011 | |
| JP | 2011223737 | A | * | 11/2011 | |
| JP | 2012-090517 | A | | 5/2012 | |
| JP | 2014107905 | A | * | 6/2014 | |
| JP | 2015-080330 | A | | 4/2015 | |

* cited by examiner

ROTATING ELECTRIC MACHINE

TECHNICAL FIELD

The present invention relates to a rotating electric machine.

BACKGROUND ART

A rotating electric machine including a rotor, a stator disposed on an outer diameter side of the rotor, and a cooling structure that drops a cooling liquid to a coil end of a stator coil wound around the stator to cool the coil end is known (see PTL 1). When the cooling liquid is dropped on the coil end, the dropped cooling liquid flows downward along the circumference of the coil end, and the coil end is cooled.

CITATION LIST

Patent Literature

PTL 1: JP 2015-80330 A

SUMMARY OF INVENTION

Technical Problem

The inventors of the present application have found a problem that since the extra-slot conductor protruding from the slot of the stator core is bent toward one side in the circumferential direction with respect to the intra-slot conductor, non-uniformness occurs in an adhesion range of the refrigerant to the coil end, and the cooling performance by the refrigerant is affected.

An object of the present invention is to suppress non-uniformness in an adhesion range of a refrigerant to a coil end and to effectively cool a stator coil.

Solution to Problem

A rotating electric machine according to one aspect of the present invention includes a rotor disposed such that a rotation center axis is horizontal, a stator disposed with an air gap between the stator and the rotor in a radial direction, and a case that supports the stator and forms a flow path through which a refrigerant flows. The stator includes a stator core having a plurality of slots and a stator coil attached to the stator core, the stator coil includes an intra-slot conductor disposed in the slot of the stator core and an extra-slot conductor disposed outside the slot, and the case forms a first outflow hole and a second outflow hole through which a refrigerant flows out toward the extra-slot conductor. in a state in which the case is installed, the first outflow hole and the second outflow hole are arranged above the extra-slot conductor, and when a bending direction of the extra-slot conductor with respect to the intra-slot conductor arranged on an outermost diameter side in the slot in the stator coil arranged above the stator is an upper coil bending direction, and a straight line perpendicular to the horizontal and passing through the rotation center axis is a vertical line, the first outflow hole is arranged on the upper coil bending direction side with respect to the vertical line, the second outflow hole is arranged on a side opposite to the upper coil bending direction with respect to the vertical line, and the first outflow hole and the second outflow hole are formed such that a second arrangement angle that is an angle formed by a straight line connecting the second outflow hole and the rotation center axis and the vertical line is larger than a first arrangement angle that is an angle formed by a straight line connecting the first outflow hole and the rotation center axis and the vertical line.

Advantageous Effects of Invention

According to the present invention, it is possible to suppress non-uniformness in the adhesion range of the refrigerant to the coil end and to effectively cool the stator coil.

DESCRIPTION OF EMBODIMENTS

A rotating electric machine according to an embodiment of the present invention will be described with reference to the drawings. The rotating electric machine according to the present embodiment is a rotating electric machine suitable to be used for traveling of a vehicle. The rotating electric machine according to the present embodiment can be applied to both a pure electric vehicle that travels only by the rotating electric machine and a hybrid electric vehicle that is driven by both an engine and the rotating electric machine. The rotating electric machine is an induction motor including a squirrel-cage rotor or is a synchronous motor including a rotor having a permanent magnet. Hereinafter, a synchronous motor used in a hybrid electric vehicle will be described as an example.

Figure 1:
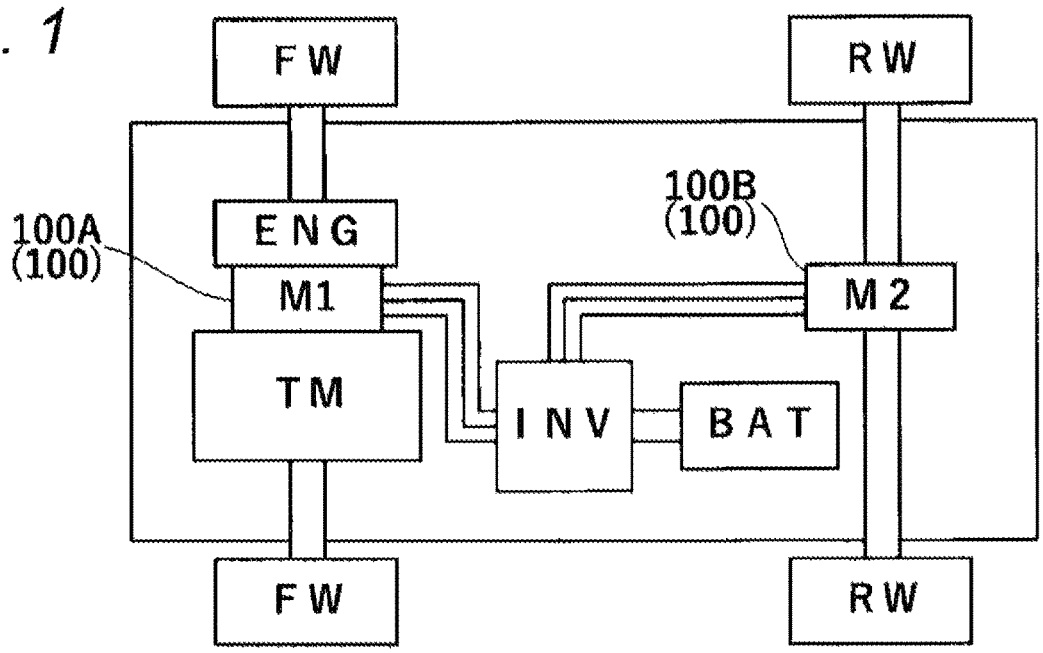
FIG. 1 is a diagram illustrating a schematic configuration of a hybrid electric vehicle equipped with a rotating electric machine according to an embodiment of the present invention.

FIG. 1 is a diagram illustrating a schematic configuration of a hybrid electric vehicle equipped with the rotating electric machine according to the embodiment of the present invention. The electric vehicle (also referred to as a vehicle)

includes an engine ENG, a first rotating electric machine 100A, and a second rotating electric machine 100B. The first rotating electric machine 100A and the second rotating electric machine 100B are also collectively referred to as a rotating electric machine 100. Power generated by the engine ENG and the first rotating electric machine 100A is shifted by a transmission TM and transmitted to front wheels FW. Power generated by the second rotating electric machine 100B is transmitted to rear wheels RW.

The rotating electric machine 100 performs a power running operation for generating a driving force and a regenerative operation for recovering energy according to a traveling state of the vehicle. Drive and power generation operations of the rotating electric machine 100 are controlled by a power conversion device INV such that the torque and the rotation speed are optimized according to the operation status of the vehicle. Power necessary for driving the rotating electric machine 100 is supplied from a battery BAT via the power conversion device INV. When the rotating electric machine 100 is in the power generation operation, the battery BAT is charged with electric energy via the power conversion device INV.

The structure of the rotating electric machine 100 will be described with reference to the drawings. Since the first rotating electric machine 100A and the second rotating electric machine 100B have substantially the same structure, the structure of the first rotating electric machine 100A will be described below as a representative example. Note that the structure described below is not necessarily employed in both the first rotating electric machine 100A and the second rotating electric machine 100B, and may be employed in only one of them. In the following description, an "axial direction", a "circumferential direction", and a "radial direction" are as follows. The "axial direction" is a direction along the rotation center axis Ca of the rotating electric machine 100 (a rotor 150). The rotation center axis Ca coincides with the center axis of a cylindrical stator 130. The "circumferential direction" is a direction along the rotation direction of the rotating electric machine 100 (the rotation direction of the rotor 150), that is, a circumferential direction orthogonal to the rotation center axis Ca and centered on the rotation center axis Ca. The "radial direction" is a radiation direction perpendicular to the rotation center axis Ca of the rotating electric machine 100 and centered on the rotation center axis Ca, that is, a radius direction. In addition, the "inner peripheral side" refers to the radially inner side (inner diameter side), and the "outer peripheral side" refers to the opposite direction, that is, the radially outer side (outer diameter side).

Figure 2:
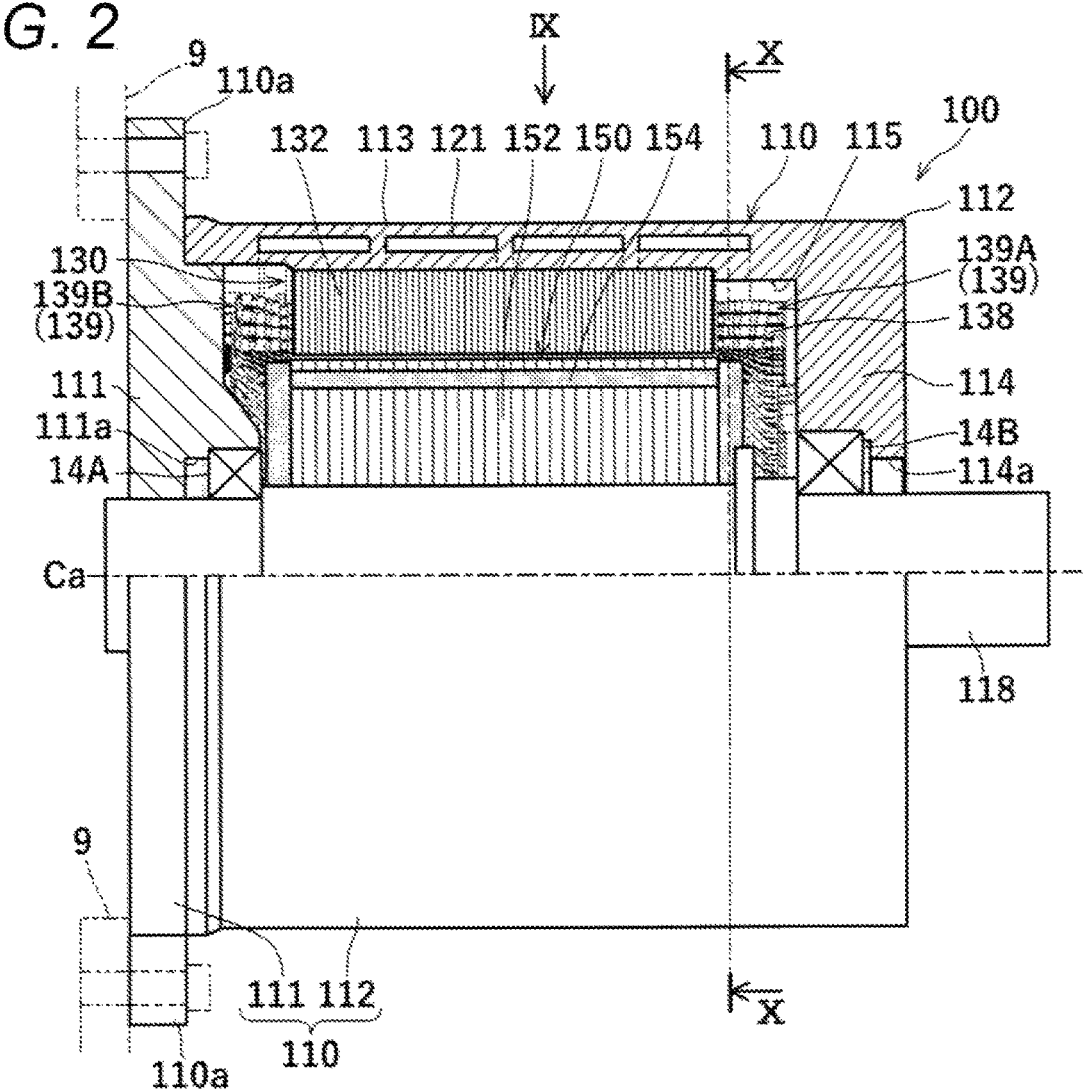
FIG. 2 is a side sectional view illustrating a configuration of the rotating electric machine according to the embodiment of the present invention.
Figure 3:
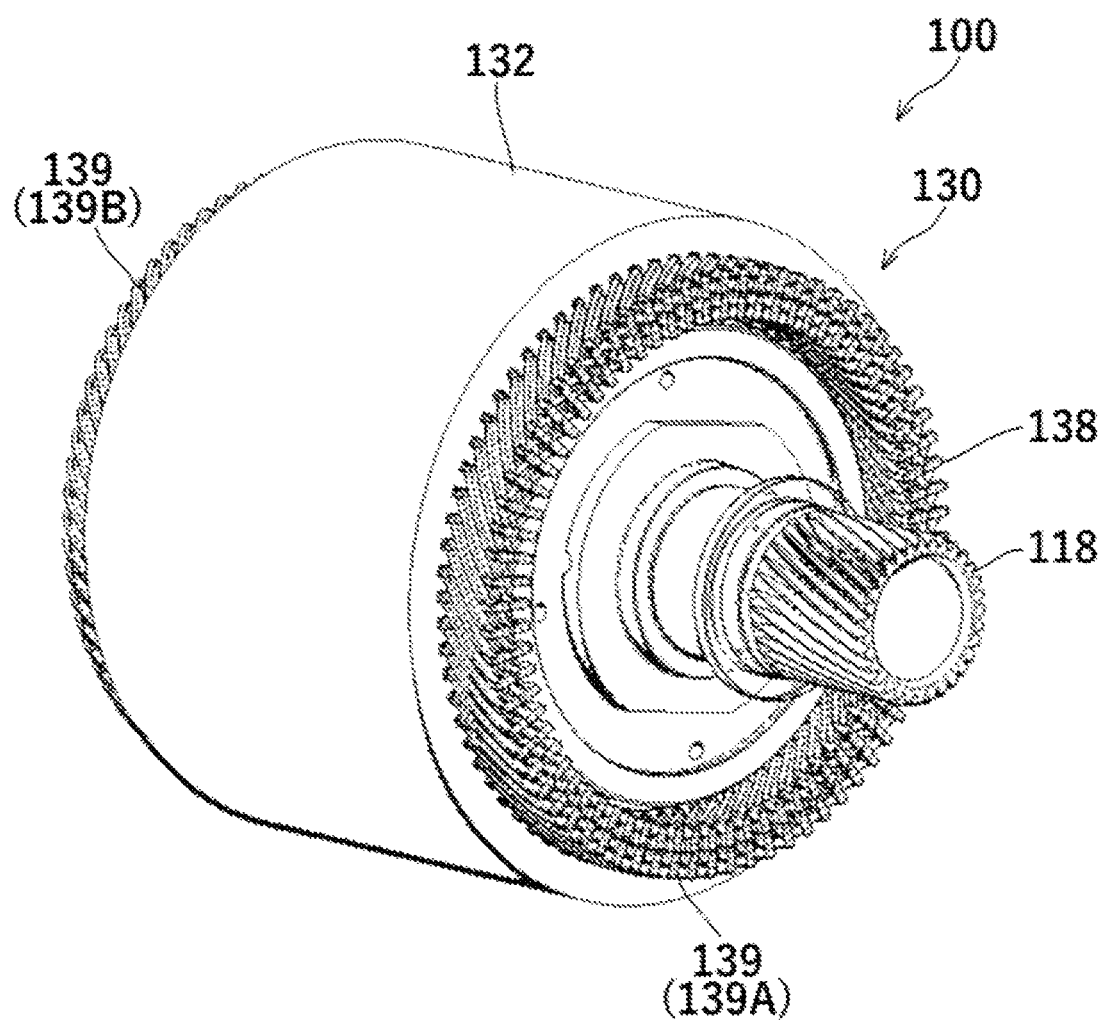
FIG. 3 is a perspective view of the rotating electric machine, and omits illustration of a case.
Figure 4:
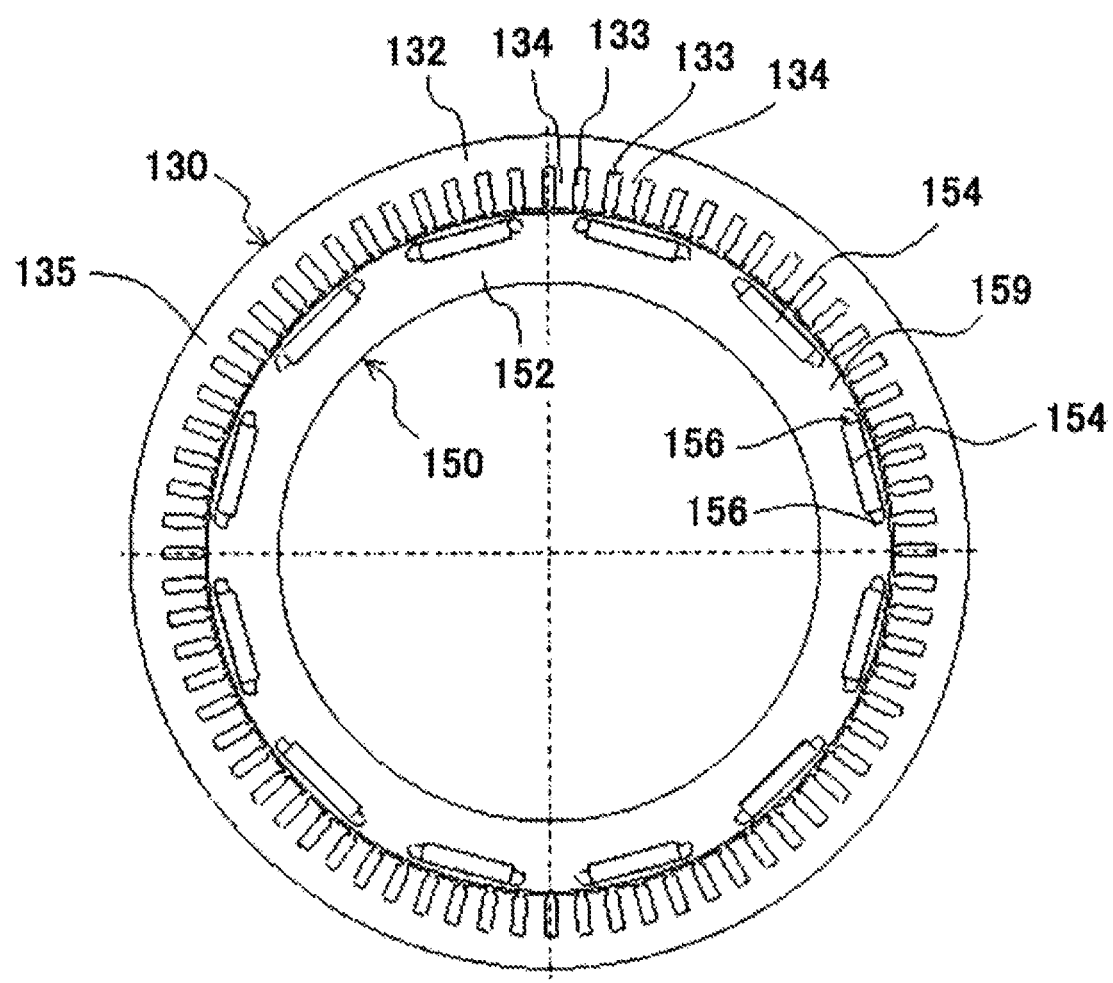
FIG. 4 is a plan cross-sectional view of a stator core and a rotor core.

FIG. 2 is a side sectional view illustrating a configuration of the rotating electric machine 100 according to the embodiment of the present invention. FIG. 2 illustrates the inside of the rotating electric machine 100 by illustrating a part of the rotating electric machine 100 in a cross section. FIG. 3 is a perspective view of the rotating electric machine 100, and omits illustration of a case 110. FIG. 4 is a plan cross-sectional view of a stator core 132 and a rotor core 152, and illustrates a cross section of the rotating electric machine 100 as viewed from the axial direction.

As illustrated in FIG. 2, the rotating electric machine 100 includes the rotor 150 rotatably provided, the stator 130 disposed outside with an air gap between the stator 130 and the rotor 150 in the radial direction, and the case 110 that supports (fixes) the stator 130.

The rotating electric machine 100 is a permanent-magnet-embedded three-phase synchronous motor generator. The rotating electric machine 100 operates as an electric motor that rotates the rotor 150 by supplying a three-phase alternating current to a stator coil 138 wound around the stator core 132. The rotating electric machine 100 is driven by the engine ENG to operate as a generator and output generated power of three-phase alternating current.

The case 110 includes a case body 112 and an end bracket 111. The case body 112 is a bottomed cylindrical member having one end opened, and has a cylindrical portion 113 and a bottom portion 114. The end bracket 111 is attached to the case body 112 so as to close the opening of the case body 112 (the opening of the cylindrical portion 113). Insertion holes 111a and 114a through which a shaft 118 is inserted are provided in the end bracket 111 and the bottom portion 114 of the case body 112. A first bearing 14A is provided in the insertion hole 111a of the end bracket 111, and a second bearing 14B is provided in the insertion hole 114a of the bottom portion 114 of the case body 112. The case 110 may be constituted by a center bracket whose both axial ends are opened and a pair of end brackets axially sandwiching the center bracket. In other words, the cylindrical portion 113 and the bottom portion 114 of the case body 112 may be provided as separate members, and the two members may be connected by a bolt or the like.

The case 110 is provided with an attachment portion 110a to be attached to a support member 9 of the vehicle body of the vehicle. The support member 9 of the vehicle body is, for example, a support member provided in the case of the transmission TM, a support member provided in the case of the engine ENG, or a support member provided between the transmission TM and the engine ENG. The rotating electric machine 100 is attached to the vehicle by fastening the attachment portion 110a to the support member 9 with a bolt or the like. The case 110 may constitute a part of the case of the transmission TM or a part of the case of the engine ENG.

The rotor 150 is fixed to the shaft 118. The shaft 118 is a columnar or cylindrical member. When the shaft 118 is supported by the first bearing 14A and the second bearing 14B, the rotor 150 is rotatably held inside the stator core 132. The rotor 150 is disposed such that the rotation center axis Ca is horizontal. That is, the attachment portion 110a of the case 110 is formed such that the rotation center axis Ca is set to be horizontal when the attachment portion 110a is attached to the support member 9.

In the cylindrical portion 113 of the case body 112, a refrigerant passage 121 as a flow path through which a liquid refrigerant flows is formed. That is, the case body 112 is a flow path forming member forming the refrigerant passage 121. In the present embodiment, the refrigerant passage 121 has a rectangular cross-sectional shape having a width (axial length) larger than a height (radial length), and is formed in a spiral shape along the circumferential direction of the cylindrical portion 113.

The refrigerant is oil having a kinematic viscosity of 4 to 24 $[mm^2/s]$ at 100° C. In the present embodiment, the refrigerant is an automatic transmission fluid (ATF) used for lubrication and cooling of components (power transmission unit and the like) in the transmission TM.

The refrigerant is sucked by a pump (not illustrated) from a refrigerant reservoir (not illustrated) in the lower portion of the rotating electric machine 100, flows out from a first outflow hole 122A and a second outflow hole 122B (see FIG. 10) formed in the upper portion of the case 110 via the refrigerant passage 121, and returns to the refrigerant reservoir. In the rotating electric machine 100, the stator coil 138 is a main heat generating portion, and heat generated in the stator coil 138 is transmitted to the case 110 via the stator core 132 and dissipated by the refrigerant flowing through the refrigerant passage 121 of the case 110. In the present embodiment, the stator coil 138 is directly cooled by dropping the refrigerant from the first outflow hole 122A and the second outflow hole 122B to a coil end 139 of the stator coil 138 and causing the refrigerant to adhere to the coil end 139. Details of the first outflow hole 122A and the second outflow hole 122B will be described later. Although not illustrated, the refrigerant is cooled by an air-cooling type or water-cooling type heat exchanger (oil cooler).

As illustrated in FIGS. 2 and 3, the stator 130 includes the cylindrical stator core 132 and the stator coil 138 attached to the stator core 132. As illustrated in FIG. 4, a plurality of (72 in the present embodiment) slots 133 parallel to the central axis direction of the stator core 132 is formed in the inner peripheral portion of the stator core 132, and a plurality of U-phase, V-phase, and W-phase phase windings constituting the stator coil 138 (see FIGS. 2, 3, and 5) is attached to the slots 133. The plurality of slots 133 is formed at equal intervals in the circumferential direction of the stator core 132.

Teeth 134 are formed between the slots 133. In the present embodiment, the plurality of teeth 134 is integrated with an annular core back 135. That is, the stator core 132 is an integrated core in which the plurality of teeth 134 and the core back 135 are integrally molded. The teeth 134 form a magnetic path in the radial direction, and the core back 135 forms a magnetic path in the circumferential direction. The teeth 134 guide a rotating magnetic field generated by the stator coil 138 to the rotor 150, and cause the rotor 150 to generate rotational torque.

The stator core 132 is formed, for example, by laminating a plurality of electromagnetic steel sheets having an annular shape. The stator core 132 is fitted and fixed to the inside of the cylindrical portion (see FIG. 2) 113 by shrink fitting, press fitting, or the like.

As illustrated in FIGS. 2 and 4, the rotor 150 includes the rotor core 152 and a plurality of permanent magnets 154 fixed to the rotor core 152. The rotor core 152 is formed, for example, by laminating a plurality of electromagnetic steel sheets having an annular shape. The permanent magnets 154 form a field pole of the rotor 150. As each of the permanent magnets 154, a neodymium-based or samarium-based sintered magnet, a ferrite magnet, a neodymium-based bonded magnet, or the like can be used.

In the rotor core 152, rectangular parallelepiped magnet insertion holes are formed at equal intervals in the circumferential direction in the vicinity of the outer peripheral portion, and the permanent magnet 154 is embedded in each magnet insertion hole and fixed with an adhesive or the like. The circumferential width of the magnet insertion hole is larger than the circumferential width of the permanent magnet 154. A magnetic gap 156 is formed between both circumferential ends of the permanent magnet 154 and both circumferential ends of the magnet insertion hole. An adhesive may be embedded in the magnetic gap 156, or the magnetic gap may be fixed integrally with the permanent magnets 154 with a resin.

The magnetization direction of the permanent magnets 154 is directed in the radial direction, and the magnetization direction is reversed for each field pole. That is, assuming that the surface on the stator 130 side of the permanent magnet 154 for forming a certain magnetic pole is magnetized to the N pole and the surface on the shaft 118 side is magnetized to the S pole, the surface on the stator 130 side of the permanent magnet 154 forming the adjacent magnetic pole is magnetized to the S pole, and the surface on the shaft 118 side is magnetized to the N pole.

In the present embodiment, an auxiliary magnetic pole 159 is formed between the permanent magnets 154 forming a magnetic pole. The auxiliary magnetic pole 159 acts so as to reduce the magnetic resistance of a q-axis magnetic flux generated by the stator coil 138. The auxiliary magnetic pole 159 makes the magnetic resistance of the q-axis magnetic flux much smaller than the magnetic resistance of the d-axis magnetic flux, so that a large reluctance torque is generated.

Figure 5:
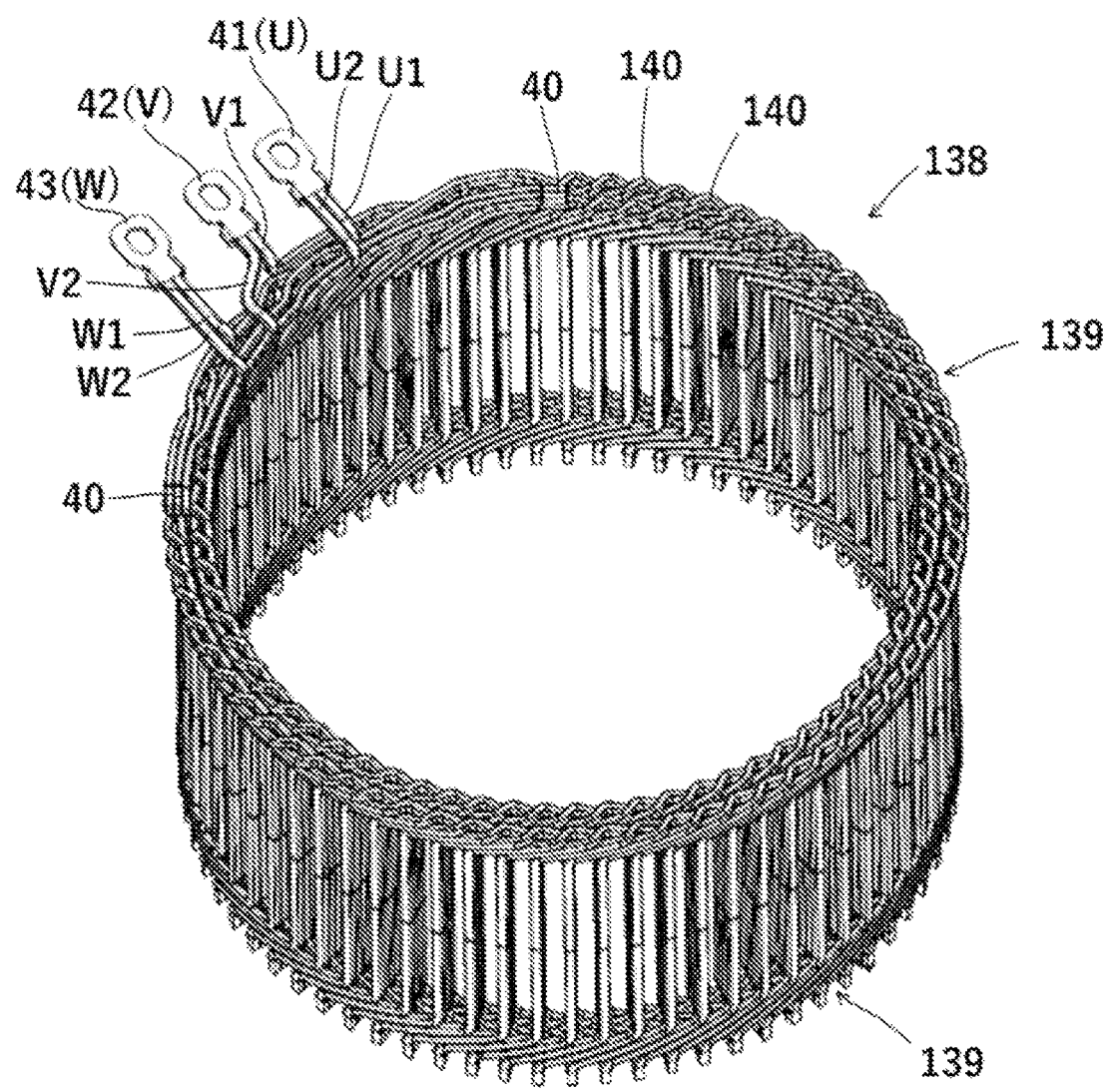
FIG. 5 is a perspective view illustrating a stator coil for three phases.
Figure 6A:
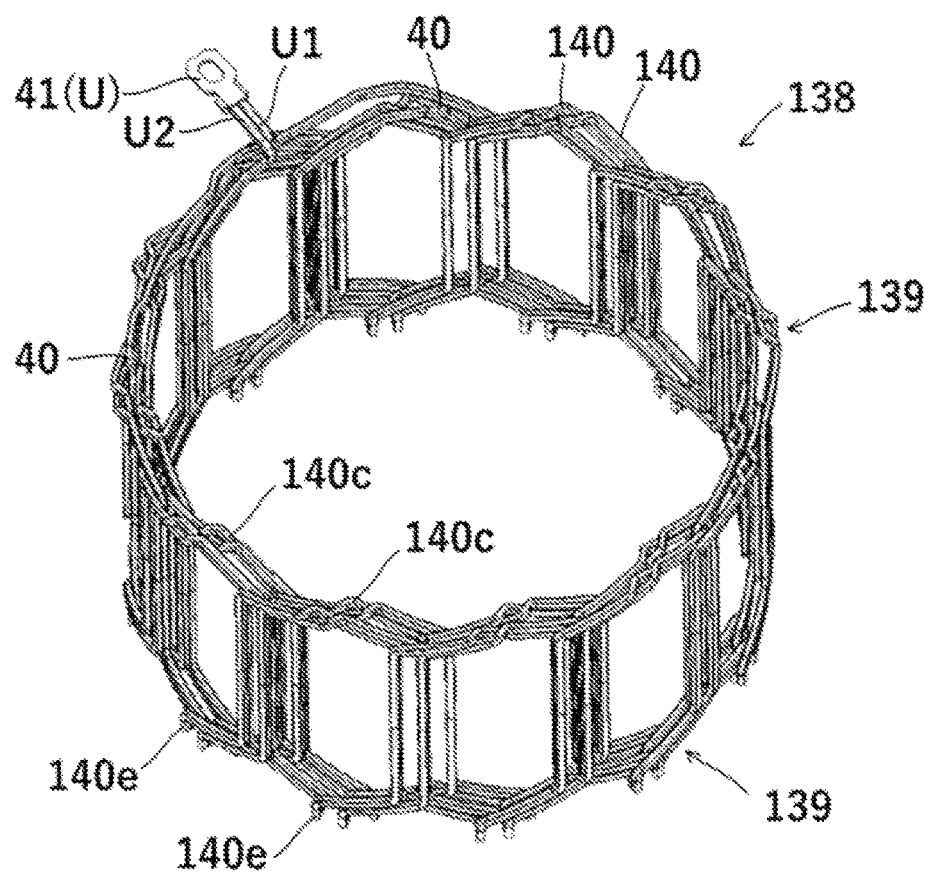
FIG. 6A is a perspective view of a U-phase stator coil wound around the stator core.
Figure 6B:
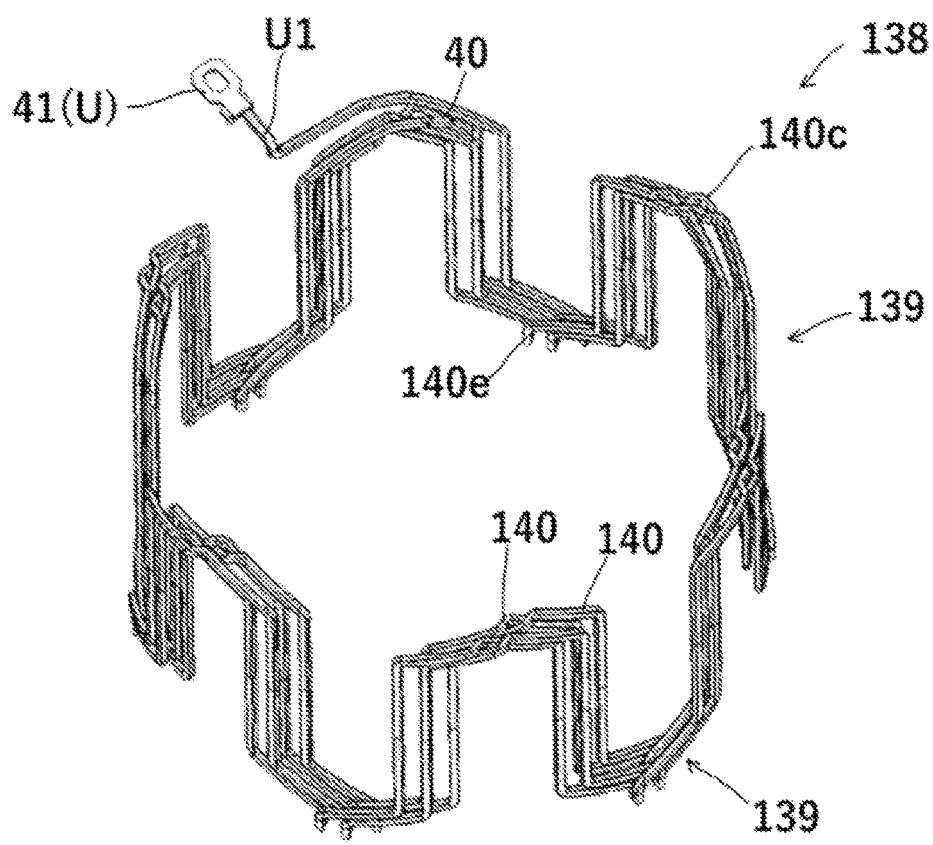
FIG. 6B is a perspective view of a U1-phase stator coil wound around the stator core.

The stator coil 138 will be described with reference to FIGS. 2 and 5 to 8. FIG. 5 is a perspective view illustrating the stator coil 138 for three phases. FIG. 6A is a perspective view of a U-phase stator coil 138 wound around the stator core 132, and illustrates U1-phase and U2-phase stator coils 138. FIG. 6B is a perspective view of the U1-phase stator coil 138 wound around the stator core 132. The stator coil 138 is wound around the stator core 132 in distributed winding (wave winding). The distributed winding is a winding method in which phase windings are wound around the stator core 132 such that the phase windings are housed in two slots 133 separated across a plurality of slots 133.

The stator coil 138 includes intra-slot conductors 137 disposed in the slots 133 of the stator core 132, and coil ends 139 which are extra-slot conductors disposed to protrude from both ends of the stator core 132 to the outside of the slots 133. For the stator coil 138, a rectangular wire (see FIG. 7 (*d*)) in which the rectangular cross section of the stator coil 138 is longer in the radial direction than in the circumferential direction is used in each slot 133. The outer periphery of the rectangular wire is covered with an insulating film.

Figure 7:
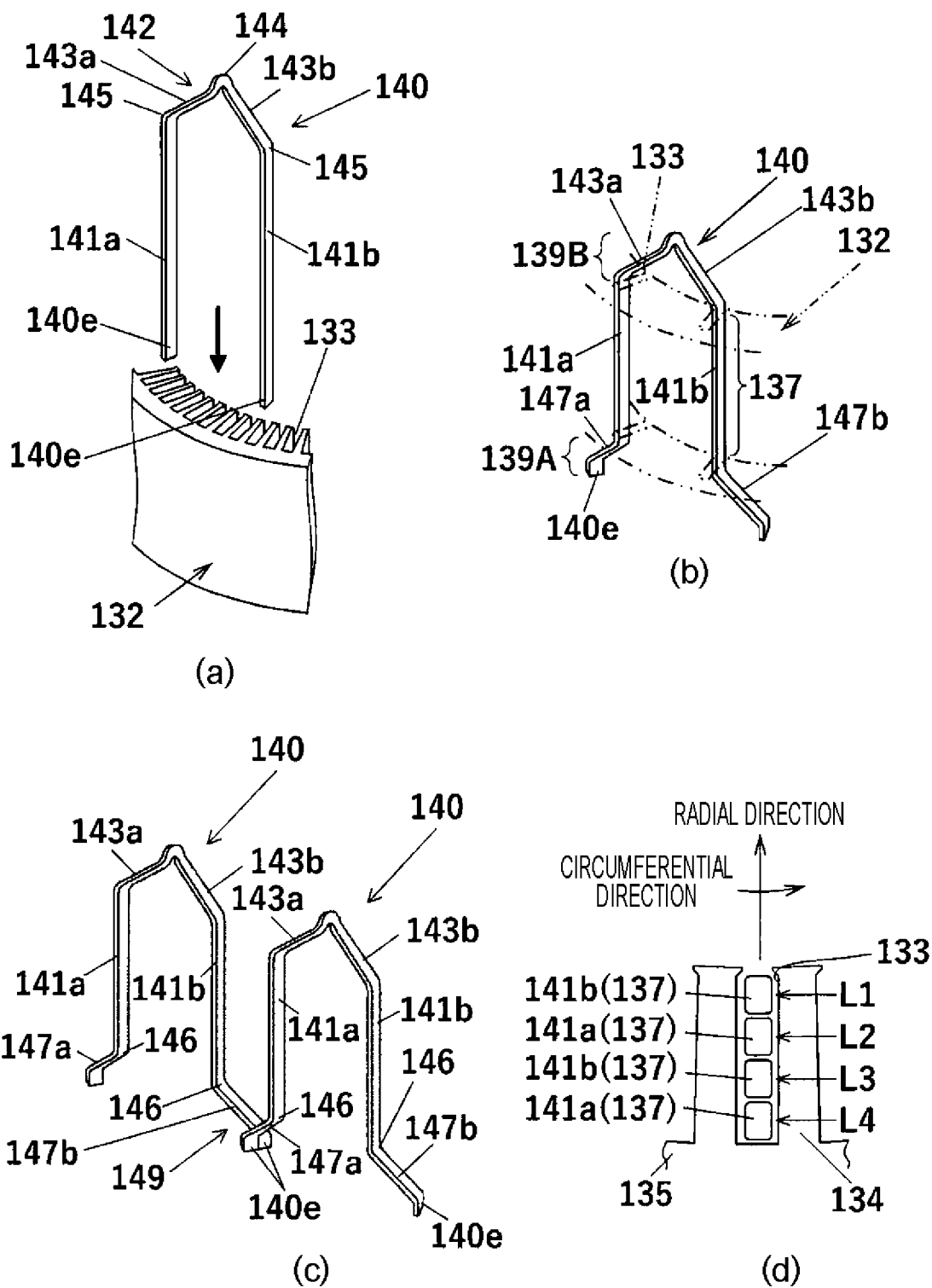
FIG. 7 is a schematic view for explaining a step of attaching segment conductors to the stator core.

As illustrated in FIGS. 6A, 6B, and 7, the stator coil 138 is a segment type coil formed by connecting a plurality of U-shaped segment conductors 140 to each other. As illustrated in FIGS. 6A and 6B, in each of the segment conductors 140, the central portion 140*c* constitutes the coil end 139 on one side in the axial direction of the stator 130, and the end portions 140*e* on both sides are welded to constitute the coil end 139 on the other side in the axial direction of the stator 130.

As illustrated in FIG. 5, a total of six systems (U1, U2, V1, V2, W1, and W2) of coils of the stator coil 138 are attached in close contact with the stator core 132. The coils of six systems constituting the stator coil 138 are arranged at appropriate intervals from each other by the slots 133.

AC terminals 41(U), 42(V), and 43(W), which are coil conductors for input/output of the stator coils 138 of the three UVW phases, and neutral point connection conductors 40 are led out to one coil end 139 of the stator coil 138. The stator 130 is connected to the power conversion device INV via the AC terminals 41(U), 42(V), and 43(W). The neutral point connection conductors 40 are disposed on both sides of the AC terminals 41(U), 42(V), and 43(W). The neutral point connection conductors 40 include a U1-phase neutral line at the end of winding of the U1 phase, a V1-phase neutral line at the end of winding of the V1 phase, and a W1-phase neutral line at the end of winding of the W1 phase, and are welded in advance. The same applies to the U2, V2, and W2 phases.

Figure 8:
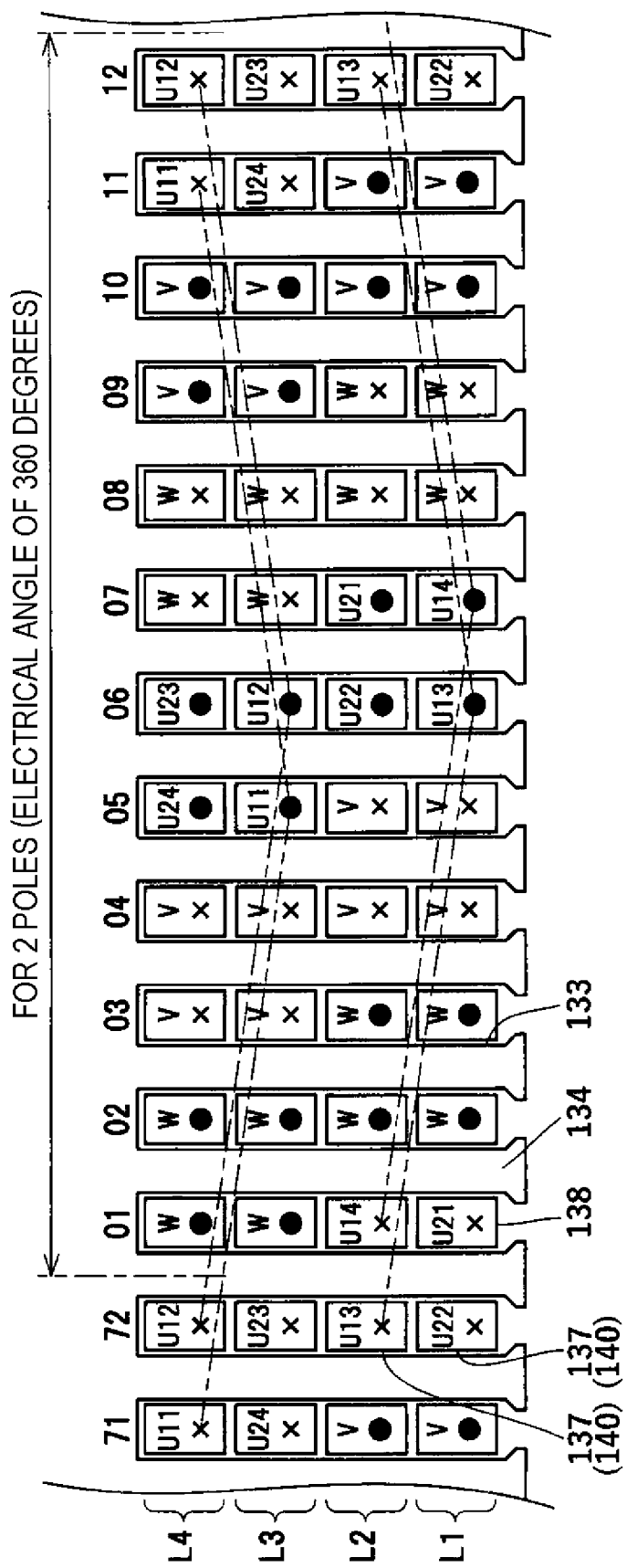
FIG. 8 is a schematic view for explaining the positions of the segment conductors inserted in slots of the stator core.

FIG. 7 is a schematic view for explaining a step of attaching the segment conductors 140 to the stator core 132. In FIG. 7(*d*), illustration of an insulating paper (slot liner) disposed between the segment conductors 140 and the slots 133 is omitted. FIG. 8 is a schematic view for explaining the positions of the segment conductors 140 inserted in the slots 133 of the stator core 132. In the present embodiment, 12 slots 133 are arranged at an electrical angle of 360 degrees, and for example, slot numbers 01 to 12 in FIG. 8 correspond to two poles. Therefore, the number of slots per pole is 6, and the number of slots per phase per pole NSPP is 2 (=6/3). Four segment conductors 140 of the stator coil 138 are inserted in each slot 133. In each of rectangular frames representing the segment conductors 140, a cross mark "x" indicating a direction from one side to the opposite side of the stator core 132 or a black circle mark "•" indicating the opposite direction is written. The U-phase segment conductors 140 are denoted by reference signs U11 to U24 representing round windings, and the V-phase and W-phase segment conductors 140 are denoted by reference signs V and W representing the phases.

As illustrated in FIG. 7(a), the segment conductor 140 is formed in a substantially U shape having a pair of leg portions 141a and 141b extending linearly and a top portion 142 connecting the pair of leg portions 141a and 141b. The top portion 142 has a pair of inclined portions 143a and 143b and a bent portion 144 that connects the pair of inclined portions 143a and 143b. Bent portions 145 in which the conductor is bent are formed between both ends of the top portion 142 and the pair of leg portions 141a and 141b. That is, the top portion 142 and the leg portions 141a and 141b are connected by the bent portions 145. The inclined portions 143a and 143b are inclined at a predetermined angle with respect to the leg portions 141a and 141b parallel to the axial direction.

When the segment conductors 140 are connected to each other to form each phase winding, as illustrated in FIG. 7(a), the pair of leg portions 141a and 141b of the segment conductor 140 is inserted into different slots 133 from one side in the axial direction of the stator core 132. Thereafter, as illustrated in FIG. 7(b), the leg portions 141a and 141b protruding to the other side in the axial direction of the stator core 132 are bent in directions where the segment conductor is to be connected, and as illustrated in FIG. 7(c), the end portions 140e of the leg portions 141a and 141b are welded to the end portions 140e of another segment conductor 140.

A portion connecting the segment conductors 140 is referred to as a connection portion 149. The connection portion 149 has a pair of inclined portions 147a and 147b and an end portion 140e provided in each of the inclined portions 147a and 147b. The end portion 140e is formed by bending a distal end portion of the inclined portion 147a so as to be parallel to the axial direction. The inclined portions 143a and 143b are connected to the leg portions 141a and 141b via bent portions 146. The bent portions 146 are formed by bending the end portions of the pair of leg portions 141a and 141b outward in the circumferential direction such that the end portions of the pair of leg portions 141a and 141b are further apart from each other. Similarly to the inclined portions 143a and 143b, the inclined portions 147a and 147b are inclined at a predetermined angle with respect to straight portions of the leg portions 141a and 141b parallel to the axial direction. Insulating films at the end portions 140e are removed before welding.

When each segment conductor 140 is welded at the end portions 140e and attached to the stator core 132 as the stator coil 138, as illustrated in FIG. 7(d), the straight portions of the pair of leg portions 141a and 141b of each segment conductor 140 are disposed in the slots 133. Therefore, the straight portions of the leg portions 141a and 141b arranged in the slots 133 correspond to the intra-slot conductors 137 of the stator coil 138.

As illustrated in FIG. 8, a plurality of (four) intra-slot conductors 137 is arranged in layers in each slot 133 of the stator core 132. In the present embodiment, four conductor insertion spaces are provided in each slot 133. The conductor insertion spaces are referred to as a first layer (L1), a second layer (L2), a third layer (L3), and a fourth layer (L4) in order from an inner peripheral side (lower side in the drawing) to an outer peripheral side (upper side in the drawing) in the radial direction. As illustrated in FIG. 7(d), the segment conductors 140 include one in which one leg portion 141b of the pair of leg portions 141a and 141b is inserted into the first layer (L1) and the other leg portion 141a is inserted into the second layer (L2), and one in which one leg portion 141b of the pair of leg portions 141a and 141b is inserted into the third layer (L3) and the other leg portion 141a is inserted into the fourth layer (L4).

As illustrated in FIG. 2, the coil end (extra-slot conductor) 139 which protrudes to the outside on one side (left side in the drawing) in the axial direction of the stator core 132 and is exposed from the stator core 132 and has a top portion 142 (see FIG. 7) is also referred to as a bent coil end 139B.

The coil end (extra-slot conductor) 139 which protrudes to the outside on the other side (right side in the drawing) in the axial direction of the stator core 132 and is exposed from the stator core 132 and has a connection portion 149 (see FIG. 7) is also referred to as a welded coil end 139A. As illustrated in FIG. 3, since the coil ends 139 are disposed so as to overlap each other in the circumferential direction of the stator core 132, the axial length of the rotating electric machine 100 can be shortened.

Figure 9:
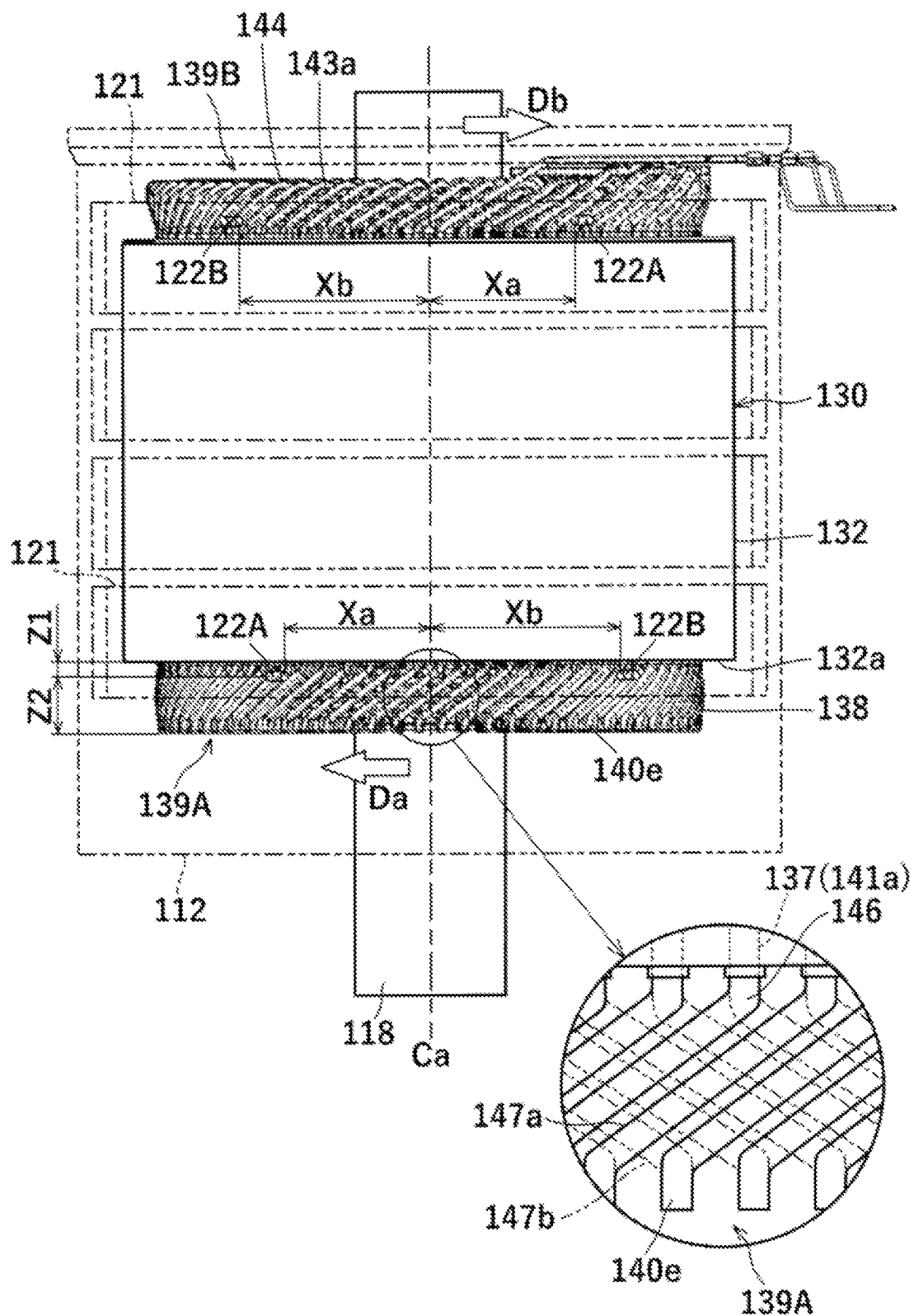
FIG. 9 is a plan view (top view) of the rotating electric machine in a state of being attached to a vehicle body.
Figure 10:
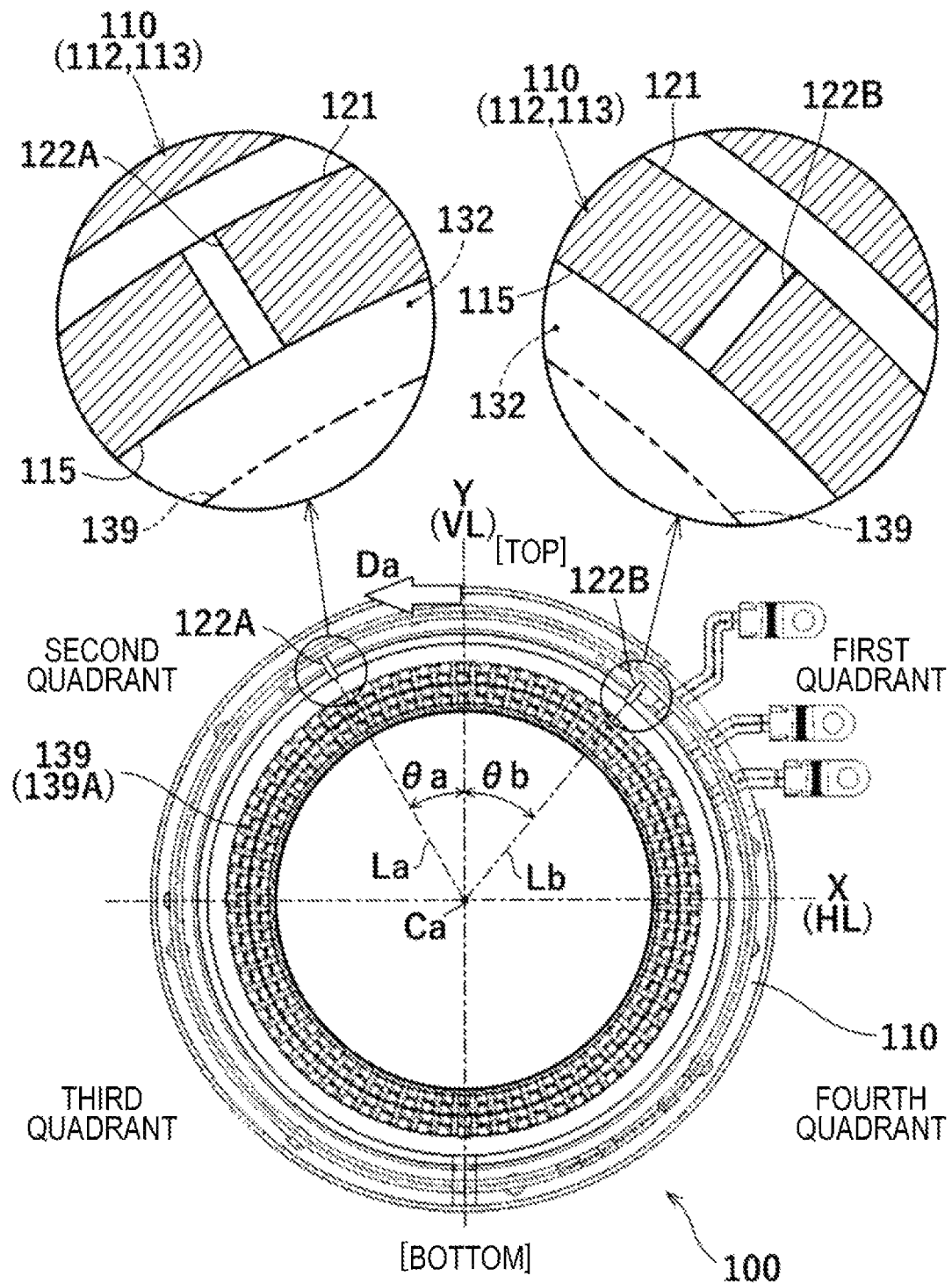
FIG. 10 is a side view of the rotating electric machine in a state of being attached to the vehicle body as viewed from the axis direction.

The outflow holes 122A and 122B through which the refrigerant flows out toward the coil ends 139 will be described in detail with reference to FIGS. 9 and 10. FIGS. 9 and 10 are a plan view (top view) of the rotating electric machine 100 in a state of being attached to the vehicle body and a side view (partial cross-sectional view) of the rotating electric machine 100 in a state of being attached to the vehicle body as viewed from the axial direction. FIG. 9 is a view illustrating the rotating electric machine 100 as viewed from the IX direction in FIG. 2. In FIG. 9, the case body 112 is indicated by a two-dot chain line, and a part of the welded coil end 139A is enlarged. FIG. 10 is a view of the welded coil end 139A as viewed from the axial direction. FIG. 10 illustrates a cross section of the case 110 taken along line X-X in FIG. 2, and illustrates the first outflow hole 122A and the second outflow hole 122B in an enlarged manner.

As illustrated in FIG. 9, the first outflow hole 122A and the second outflow hole 122B are provided on each of one axial end side (the bent coil end 139B side) and the other axial end side (the welded coil end 139A side) of the case body 112. Note that there are only two refrigerant outflow holes in total, that is, the first outflow hole 122A and the second outflow hole 122B on one end side of the case body 112 in the axial direction, and there is no refrigerant outflow hole through which the refrigerant drops toward the bent coil end 139B side other than the first outflow hole 122A and the second outflow hole 122B. Similarly, there are only two refrigerant outflow holes in total, that is, the first outflow hole 122A and the second outflow hole 122B on the other end side of the case body 112 in the axial direction, and there is no refrigerant outflow hole through which the refrigerant drops toward the welded coil end 139A other than the first outflow hole 122A and the second outflow hole 122B. The first outflow hole 122A and the second outflow hole 122B are provided on each of one axial end side (the bent coil end 139B side) and the other axial end side (the welded coil end 139A side) of the case body 112, and have the same configuration. Therefore, hereinafter, the first outflow holes 122A and the second outflow hole 122B through which the refrigerant drops toward the welded coil end 139A will be described as representatives.

FIGS. 9 and 10 illustrate a state in which the attachment portion 110a of the case 110 is attached to the support member 9 of the vehicle body (see FIG. 2) and the case 110 is installed at a predetermined position in the vehicle body. As illustrated in FIGS. 9 and 10, in a state where the case 110 is installed, the first outflow holes 122A and the second outflow holes 122B are disposed above the coil ends 139. The first outflow holes 122A and the second outflow holes 122B are through-holes having a circular cross section and penetrating in the radial direction from the inner peripheral surface 115 of the case 110 (cylindrical portion 113) through the refrigerant passage 121 and communicating with the inner space of the case 110 and the refrigerant passage 121. The first outflow holes 122A and the second outflow holes 122B allow the refrigerant to flow out from the refrigerant passage 121 toward the coil ends 139.

As illustrated in FIG. 9, the conductor (inclined portion 147a) constituting the outermost peripheral portion of the welded coil end 139A is bent toward one side in the circumferential direction at the bent portion 146 with respect to the intra-slot conductor 137 (leg portion 141a). The conductor (inclined portion 143a) constituting the outermost peripheral portion of the bent coil end 139B is bent toward the other side in the circumferential direction at the bent portion 145 with respect to the intra-slot conductor 137 (leg portion 141a).

In the following description, a bending direction of the extra-slot conductor with respect to the intra-slot conductor in the conductor constituting the outermost peripheral portion of the coil end 139 disposed on the upper portion of the stator 130 is referred to as an upper coil bending direction. More specifically, the upper coil bending direction is a bending direction of the extra-slot conductor (corresponding to the inclined portions 143a and 147a of the segment conductor 140 illustrated in FIG. 7) with respect to the intra-slot conductor (corresponding to the straight portion of the leg portion 141a of the segment conductor 140 illustrated in FIG. 7) arranged on the outermost diameter side in the slot 133 in the stator coil 138 (see the enlarged view) arranged at the upper portion (for example, the top portion) of the stator 130 when the stator 130 is viewed from above. That is, the upper coil bending direction in the welded coil end 139A is the bending direction of the inclined portion 147a with respect to the leg portion 141a in the segment conductor 140, and the upper coil bending direction in the bent coil end 139B is the bending direction of the inclined portion 143a with respect to the leg portion 141a in the segment conductor 140. Therefore, the upper coil bending direction Da of the welded coil end 139A is the left direction in the drawing, and the upper coil bending direction Db of the bent coil end 139B is the right direction in the drawing. As illustrated in FIG. 10, a straight line (vertical line) that is perpendicular to the horizontal and passes through the rotation center axis Ca is defined as a vertical line VL.

As illustrated in FIGS. 9 and 10, the first outflow hole 122A is disposed on the upper coil bending direction Da side (left side in the drawing) with respect to the vertical line VL, and the second outflow hole 122B is disposed on the opposite side (right side in the drawing) to the upper coil bending direction Da with respect to the vertical line VL. As illustrated in FIG. 10, in a coordinate system in which the rotation center axis Ca is the origin, a horizontal line (a line parallel to a horizontal plane) HL passing through the rotation center axis Ca is an X axis, and a vertical line VL is a Y axis, when divided into a first quadrant, a second quadrant, a third quadrant, and a fourth quadrant in a counterclockwise direction (that is, one circumferential direction in which the extra-slot conductor (inclined portion 147a) is inclined with respect to the intra-slot conductor 137 (leg portion 141a) arranged in the fourth layer L4) as illustrated, the first outflow hole 122A is arranged in the second quadrant, and the second outflow hole 122B is arranged in the first quadrant.

As described above, the extra-slot conductor (inclined portion 147a) protruding from the slot 133 of the stator core 132 is bent toward one side in the circumferential direction (counterclockwise direction in the drawing) with respect to the intra-slot conductor 137. The refrigerant dropped from the first outflow hole 122A and the second outflow hole 122B to the outermost peripheral portion of the coil end 139 flows along the coil conductor (inclined portion 147a) of the outermost peripheral portion. For this reason, if the first outflow hole 122A and the second outflow hole 122B are disposed symmetrically with respect to the vertical line VL, there is a possibility that non-uniformness occurs in the adhesion range of the refrigerant to the coil end 139. Therefore, in the present embodiment, by arranging the first outflow hole 122A and the second outflow hole 122B asymmetrically with respect to the vertical line VL, non-uniformness in the adhesion range of the refrigerant is reduced.

As illustrated in FIG. 10, the first outflow hole 122A and the second outflow hole 122B are formed such that an arrangement angle (hereinafter, also referred to as a second arrangement angle $\theta b$) of the second outflow hole 122B is larger than an arrangement angle (hereinafter, also referred to as a first arrangement angle $\theta a$) of the first outflow hole 122A with reference to the vertical line VL. The first arrangement angle $\theta a$ corresponds to an angle (acute angle) formed by a straight line (line segment) La connecting the center of the refrigerant outlet portion of the first outflow hole 122A and the rotation center axis Ca and a half straight line extending upward from the rotation center axis Ca on the vertical line VL. The second arrangement angle $\theta b$ corresponds to an angle (acute angle) formed by a straight line (line segment) Lb connecting the center of the refrigerant outlet portion of the second outflow hole 122B and the rotation center axis Ca and the half straight line extending upward from the rotation center axis Ca on the vertical line VL. That is, the closer the first arrangement angle $\theta a$ and the second arrangement angle $\theta b$ are to the vertical line VL, the smaller the first arrangement angle $\theta a$ and the second arrangement angle $\theta b$ become.

In other words, as illustrated in FIG. 9, the first outflow hole 122A and the second outflow hole 122B are formed such that a horizontal distance Xb between the center of the refrigerant outlet portion of the second outflow hole 122B and the rotation center axis Ca (or the vertical line VL) is larger than a horizontal distance Xa between the center of the refrigerant outlet portion of the first outflow hole 122A and the rotation center axis Ca (or the vertical line VL).

As illustrated in FIG. 10, in the present embodiment, the first arrangement angle $\theta a$ is 30 degrees, and the second arrangement angle $\theta b$ is 40 degrees. The first arrangement angle $\theta a$ and the second arrangement angle $\theta b$ can be set to various angles according to the kinematic viscosity of the refrigerant, but it is preferable to set the first arrangement angle $\theta a$ and the second arrangement angle $\theta b$ such that an angle difference $\Delta\theta$ ($\theta b - \theta a$) between the first arrangement angle $\theta a$ and the second arrangement angle $\theta b$ is at least equal to or larger than a slot pitch angle (in the present embodiment, $360/72 = 5$ degrees). When the first outflow hole 122A and the second outflow hole 122B are provided at positions close to the horizontal line HL (X axis), the upper portion of the coil end 139 cannot be effectively cooled. Therefore, the first arrangement angle θa and the second arrangement angle θb are preferably set to 45 degrees or less. Therefore, it is preferable to set the first arrangement angle θa and the second arrangement angle θb such that the angle difference Δθ between the first arrangement angle θa and the second arrangement angle θb is 5 degrees or more and 15 degrees or less.

As illustrated in FIG. 9, the first outflow hole 122A and the second outflow hole 122B are provided at positions overlapping the coil end 139 when the stator 130 is viewed from above (directly above). That is, the coil end 139 is disposed on the vertical axis passing through the refrigerant outlet portions of the first outflow hole 122A and the second outflow hole 122B. The first outflow hole 122A and the second outflow hole 122B are formed at positions closer to the end surface 132a of the stator core 132 than to the axial end of the coil end 139. That is, the axial distance Z1 from the centers of the refrigerant outlet portions of the first outflow hole 122A and the second outflow hole 122B to the end surface 132a of the stator core 132 is shorter than the axial distance Z2 from the centers of the refrigerant outlet portions of the first outflow hole 122A and the second outflow hole 122B to the axial end of the coil end 139 (Z1<Z2). The axial distance Z2 is a distance between the centers of the refrigerant outlet portions of the first outflow hole 122A and the second outflow hole 122B and the tip of the end portion 140e in the welded coil end 139A, and is a distance between the centers of the refrigerant outlet portions of the first outflow hole 122A and the second outflow hole 122B and the tip of the bent portion 144 in the bent coil end 139B. In this manner, by forming the first outflow holes 122A and the second outflow holes 122B closer to the stator core 132, not only the coil ends 139 but also the end surface 132a of the stator core 132 can be effectively cooled by the refrigerant.

Figure 11A:
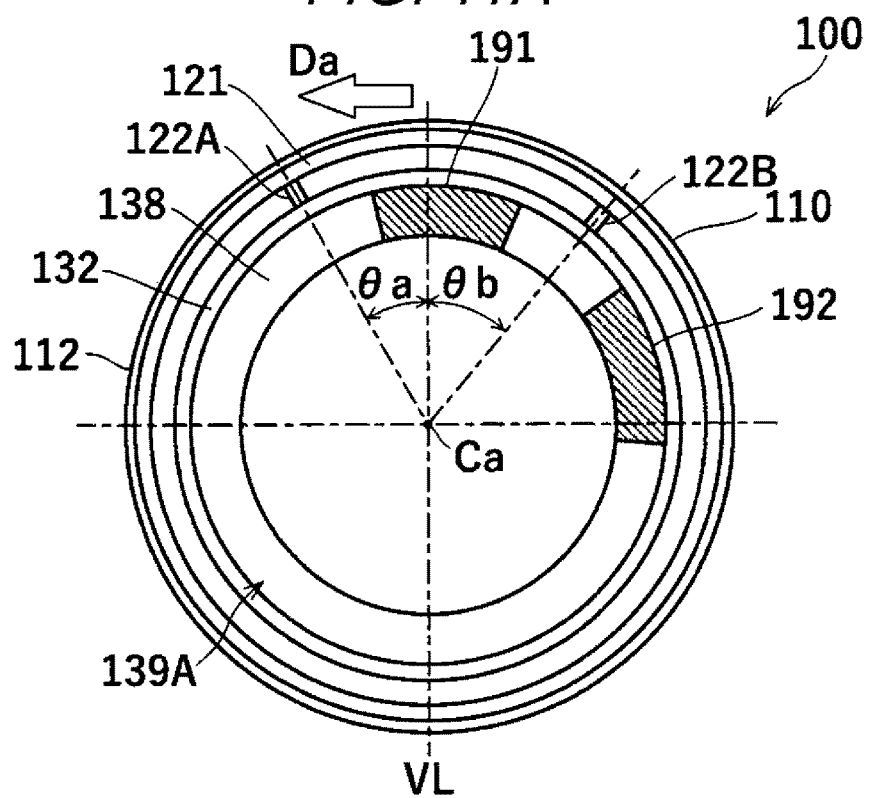
FIG. 11A is a diagram illustrating an adhesion range of a refrigerant in the rotating electric machine according to the present embodiment.
Figure 11B:
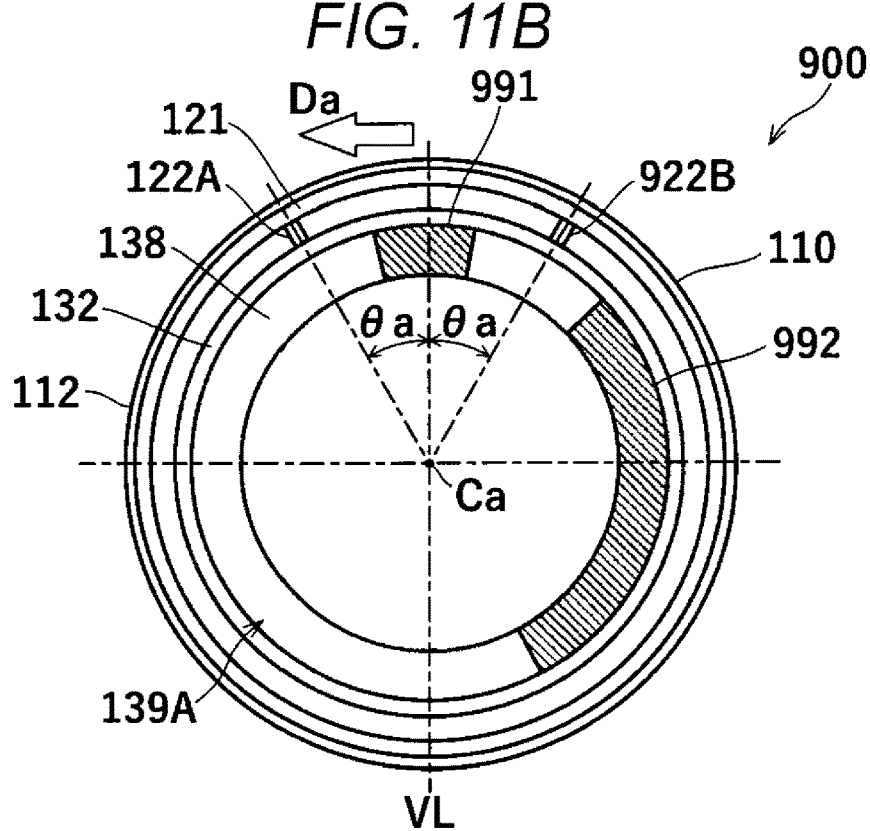
FIG. 11B is a diagram illustrating an adhesion range of a refrigerant in a rotating electric machine according to a comparative example of the present embodiment.

FIG. 11A is a diagram illustrating an adhesion range of the refrigerant to the welded coil end 139A in the rotating electric machine 100 according to the present embodiment, and FIG. 11B is a diagram illustrating an adhesion range of a refrigerant to a welded coil end 139A in a rotating electric machine 900 according to a comparative example of the present embodiment. FIGS. 11A and 11B are schematic side views of the rotating electric machines when the welded coil ends 139A are viewed from the axial direction. The rotating electric machine 900 according to the comparative example of the present embodiment is different from the rotating electric machine 100 according to the present embodiment only in the position of a second outflow hole 922B. In the rotating electric machine 900 according to the comparative example, a first outflow hole 122A and the second outflow hole 922B are provided line-symmetrically with respect to the vertical line VL.

In FIGS. 11A and 11B, non-adhesion ranges 191, 192, 991, and 992, which are ranges where the refrigerant does not adhere, obtained from the result of a computer simulation performed under the same condition are schematically indicated by hatched portions (shaded portions). As illustrated in FIGS. 11A and 11B, the simulation confirms that the non-adhesion ranges 191, 192, 991, and 992 are present on upper portions and side portions (right portions in the drawing) of the coil ends 139 in both the rotating electric machine 100 and the rotating electric machine 900. That is, it has been confirmed that, in each of the rotating electric machine 100 and the rotating electric machine 900, the adhesion range of the refrigerant to the right portion of the coil end 139 in the drawing is smaller than that on the left portion of the coil end 139 in the drawing, and non-uniformness occurs in the adhesion range of the refrigerant to the left and right side portions of the coil end 139.

The non-adhesion range 191 on the upper portion of the welded coil end 139A according to the present embodiment is larger than the non-adhesion range 991 on the upper portion of the welded coil end 139A according to the comparative example, but the non-adhesion range 192 on the side portion of the welded coil end 139A according to the present embodiment is smaller than the non-adhesion range 992 on the side portion of the welded coil end 139A according to the comparative example. Since the difference between the non-adhesion range 192 and the non-adhesion range 992 on the side portions of the coil ends 139 is larger than the difference between the non-adhesion range 191 and the non-adhesion range 991 on the upper portions of the coil ends 139, the total non-adhesion area of the rotating electric machine 100 according to the present embodiment is smaller than the total non-adhesion area of the rotating electric machine 900 according to the comparative example.

In the present embodiment, it has been confirmed by simulation that the total adhesion range of the refrigerant to the coil end 139 of the rotating electric machine 100 is about 20% larger than the total adhesion range of the refrigerant to the coil end 139 of the rotating electric machine 900.

As illustrated in FIG. 9, since the upper coil bending direction Da of the welded coil end 139A is the left direction, the refrigerant dropped on the welded coil end 139A easily flows toward the left direction. Therefore, as illustrated in FIG. 11B, in the rotating electric machine 900 in which the first outflow hole 122A and the second outflow hole 922B are disposed symmetrically with respect to the vertical line VL, the refrigerant flowing out from the second outflow hole 922B easily flows toward the left direction along the conductor of the outermost peripheral portion of the welded coil end 139A, and the non-adhesion range 992 on the right side is large (see FIG. 11A). That is, in the comparative example, the range in which the refrigerant adheres on the side opposite to the upper coil bending direction Da is smaller than the range in which the refrigerant adheres on the upper coil bending direction Da side with reference to the vertical line VL, and the adhesion range is significantly non-uniform in the left and right portions.

On the other hand, in the present embodiment, as compared with the comparative example, since the second outflow hole 122B is disposed at a position shifted in the direction opposite to the upper coil bending direction Da (that is, the direction in which the refrigerant is guided) from the line symmetrical position of the first outflow hole 122A with reference to the vertical line VL, the non-adhesion range 192 on the right side portion of the welded coil end 139A can be reduced, and non-uniformness in the adhesion range of the refrigerant to the left and right side portions of the welded coil end 139A can be suppressed as compared with the comparative example. Therefore, according to the present embodiment, the adhesion area of the refrigerant to the entire welded coil end 139A can be increased, and the welded coil end 139A can be effectively cooled.

Although the welded coil end 139A has been described as a representative, the first outflow hole 122A and the second outflow hole 122B through which the refrigerant drops onto the bent coil end 139B also have the same configuration. As illustrated in FIG. 9, the upper coil bending direction Db in the bent coil end 139B is the right direction in the drawing, and is opposite to the upper coil bending direction Da in the welded coil end 139A. Therefore, when the rotating electric machine 100 is viewed from above, the first outflow hole 122A and the second outflow hole 122B on the bent coil end 139B side are disposed opposite to the first outflow hole 122A and the second outflow hole 122B on the welded coil end 139A side in the left-right direction.

According to the embodiment described above, the following operational effects are obtained.

(1) The rotating electric machine 100 includes a rotor 150 disposed such that a rotation center axis Ca is horizontal, a stator 130 disposed with an air gap between the rotor 150 and the stator 130 in a radial direction, and a case 110 that supports the stator 130 and forms a refrigerant passage (flow path) 121 through which a refrigerant flows.

The stator 130 includes a stator core 132 having a plurality of slots 133 and a stator coil 138 attached to the stator core 132. The stator coil 138 includes an intra-slot conductor 137 disposed in the slot 133 of the stator core 132 and a coil end (extra-slot conductor) 139 disposed outside the slot. The case 110 forms a first outflow hole 122A and a second outflow hole 122B through which the refrigerant flows out toward the coil end (extra-slot conductor) 139. In a state where the case 110 is installed, the first outflow hole 122A and the second outflow hole 122B are arranged above the coil end (extra-slot conductor) 139, and when a bending direction of the coil end (extra-slot conductor) 139 with respect to the intra-slot conductor 137 arranged on the outermost diameter side in the slot 133 in the stator coil 138 arranged above the stator 130 is an upper coil bending direction, and a straight line perpendicular to the horizontal and passing through the rotation center axis Ca is a vertical line VL, the first outflow hole 122A is arranged on the upper coil bending direction side with respect to the vertical line VL, and the second outflow hole 122B is arranged on a side opposite to the upper coil bending direction with respect to the vertical line VL. The first outflow hole 122A and the second outflow hole 122B are formed such that a second arrangement angle θb that is an angle formed by a straight line Lb connecting the second outflow hole 122B and the rotation center axis Ca and the vertical line VL is larger than a first arrangement angle θa that is an angle formed by a straight line La connecting the first outflow hole 122A and the rotation center axis Ca and the vertical line VL.

As described above, in the present embodiment, the second outflow hole 122B is disposed at a position shifted in the direction opposite to the upper coil bending directions (that is, the direction in which the refrigerant is guided) Da and Db from the line symmetrical position of the first outflow hole 122A with reference to the vertical line VL. Therefore, the range of the adhesion to the side portion of the coil end 139 on the side opposite to the upper coil bending directions Da and Db can be increased. As a result, it is possible to suppress non-uniformness in the adhesion range of the refrigerant to the left and right side portions of the coil end 139 with reference to the vertical line VL, to increase the adhesion area of the refrigerant to the entire coil end 139, and to effectively cool the stator coil 138. According to the present embodiment, since the current supplied to the stator coil 138 can be increased by improving the cooling performance, the output of the rotating electric machine 100 can be improved and the efficiency can be improved.

(2) The first outflow hole 122A and the second outflow hole 122B are formed at positions closer to an end surface 132a of the stator core 132 than to an axial end of the coil end (extra-slot conductor) 139. By disposing the first outflow hole 122A and the second outflow hole 122B closer to the stator core 132 than to the axial end of the coil end 139, it is possible to cool the coil end 139 while cooling the end surface 132a of the stator core 132. That is, according to this configuration, the end portion of the stator core 132 can be effectively cooled.

(3) The refrigerant is oil having a kinematic viscosity of 4 to 24 [mm$^2$/s] at 100° C. Therefore, it is possible to effectively cool the stator coil 138 by directly cooling the coil end 139 while suppressing corrosion of the coil end 139.

(4) An angle difference Δθ between the first arrangement angle θa and the second arrangement angle θb is 5 degrees or more and 15 degrees or less. As a result, it is possible to effectively increase the adhesion range of the refrigerant to the side portion of the coil end 139 while suppressing a decrease in the adhesion range of the refrigerant to the upper portion of the coil end 139.

The following modifications are also within the scope of the present invention, and it is also possible to combine configurations indicated in the modifications with the configuration described in the above-described embodiment, and combine the configurations described in the following different modifications.

Modification 1

In the above embodiment, an example in which the first outflow holes 122A and the second outflow holes 122B are formed near the end surface 132a of the stator core 132 has been described. However, the first outflow holes and the second outflow holes may be formed near the axial ends of the coil ends 139. As described above, by forming the first outflow holes 122A and the second outflow holes 122B near the end surface 132a of the stator core 132, the end surface 132a of the stator core 132 can be directly cooled by the refrigerant together with the coil end 139, which is preferable.

Modification 2

In the above embodiment, an example has been described in which the cross-sectional shapes (the shape of the flow path cross section orthogonal to the flow of the refrigerant) of the first outflow holes 122A and the second outflow holes 122B are circular, but the present invention is not limited thereto. For example, the cross-sectional shapes of each of the first outflow holes 122A and the second outflow holes 122B may be an elliptical shape, a polygonal shape, or an irregular shape.

Modification 3

In the above embodiment, an example in which the stator coil 138 is a rectangular wire having a rectangular cross-sectional shape has been described, but the present invention is not limited thereto. The cross-sectional shape of the stator coil 138 may be a polygonal shape such as a triangular shape and a pentagonal shape, a circular shape, an elliptical shape, or an irregular shape.

Modification 4

In the above embodiment, an example has been described in which the first outflow hole 122A and the second outflow hole 122B are provided on each of the one axial end side (the bent coil end 139B side) and the other axial end side (the welded coil end 139A side) of the case body 112, but the present invention is not limited thereto. The first outflow hole 122A and the second outflow hole 122B may be provided only on one axial end side (the bent coil end 139B side) of the case body 112, or the first outflow hole 122A and the second outflow hole 122B may be provided only on the other axial end side (the welded coil end 139A side) of the case body 112.

Modification 5

The arrangement configuration of the segment conductors 140 (see FIG. 8) is not limited to that described in the above embodiment. The number of the slots 133 of the stator core 132 is not limited to that described in the above embodiment.

Modification 6

In the above embodiment, an example in which the four layers (L1, L2, L3, L4) are formed in the slots 133 has been described, but the present invention is not limited thereto. For example, the present invention may be applied to a rotating electric machine including a stator in which two layers are formed in slots 133 or a stator in which six or more layers are formed.

Modification 7

In the above embodiment, an example in which the stator coil 138 is wound around the stator core 132 in wave winding has been described, but the present invention is not limited thereto. The present invention may be applied to a rotating electric machine in which a stator coil 138 is wound around a stator core 132 in lap winding.

Modification 8

In the above embodiment, an example in which the rotating electric machine 100 is mounted on a vehicle has been described, but the present invention is not limited thereto. The present invention can be applied to a case where the rotating electric machine 100 is installed in a machine such that the rotation center axis Ca is horizontal.

Although the embodiment of the present invention has been described above, the above embodiment merely indicates a part of the application example of the present invention, and the technical scope of the present invention is not intended to be limited to the specific configuration of the above embodiment.

REFERENCE SIGNS LIST

100 rotating electric machine
110 case
112 case body
113 cylindrical portion
121 refrigerant passage (flow path)
122A first outflow hole
122B second outflow hole
130 stator
132 stator core
132a end surface of stator core
133 slot
137 intra-slot conductor
138 stator coil
139 coil end (extra-slot conductor)
139A welded coil end
139B bent coil end
140 segment conductor
150 rotor
152 rotor core
153 refrigerant passage
Ca rotation center axis
Da upper coil bending direction of welded coil end
Db upper coil bending direction of bent coil end
HL horizontal line
L1 first layer
L2 second layer
L3 third layer
L4 fourth layer
TM transmission
VL vertical line
θa first arrangement angle
θb second arrangement angle
Δθ angle difference

The invention claimed is:

1. A rotating electric machine comprising:
a rotor disposed such that a rotation center axis is horizontal;
a stator disposed with an air gap between the stator and the rotor in a radial direction; and
a case that supports the stator and forms a flow path through which a refrigerant flows,
wherein
the stator includes a stator core having a plurality of slots and a stator coil attached to the stator core,
the stator coil includes an intra-slot conductor disposed in the slot of the stator core and an extra-slot conductor disposed outside the slot,
the case forms a first outflow hole and a second outflow hole through which the refrigerant flows out toward the extra-slot conductor,
in a state where the case is installed,
the first outflow hole and the second outflow hole are disposed above the extra-slot conductor,
when a bending direction of the extra-slot conductor with respect to the intra-slot conductor disposed on an outermost diameter side in the slot in the stator coil disposed on an upper portion of the stator is defined as an upper coil bending direction, and a straight line perpendicular to the horizontal and passing through the rotation center axis is defined as a vertical line,
the first outflow hole is disposed on the upper coil bending direction side with respect to the vertical line, and
the second outflow hole is disposed on a side opposite to the upper coil bending direction with respect to the vertical line, and
the first outflow hole and the second outflow hole are formed such that a second arrangement angle that is an angle formed by a straight line connecting the second outflow hole and the rotation center axis and the vertical line is larger than a first arrangement angle that is an angle formed by a straight line connecting the first outflow hole and the rotation center axis and the vertical line.

2. The rotating electric machine according to claim 1, wherein the first outflow hole and the second outflow hole are formed at positions closer to an end surface of the stator core than to an axial end of the extra-slot conductor.

3. The rotating electric machine according to claim 1, wherein the refrigerant is oil having a kinematic viscosity of 4 to 24 [mm$^2$/s] at 100° C.

4. The rotating electric machine according to claim 1, wherein an angle difference between the first arrangement angle and the second arrangement angle is 5 degrees or more and 15 degrees or less.

* * * * *